(No Model.)
J. E. FISHER.
VEHICLE WHEEL.
No. 397,711. Patented Feb. 12, 1889.
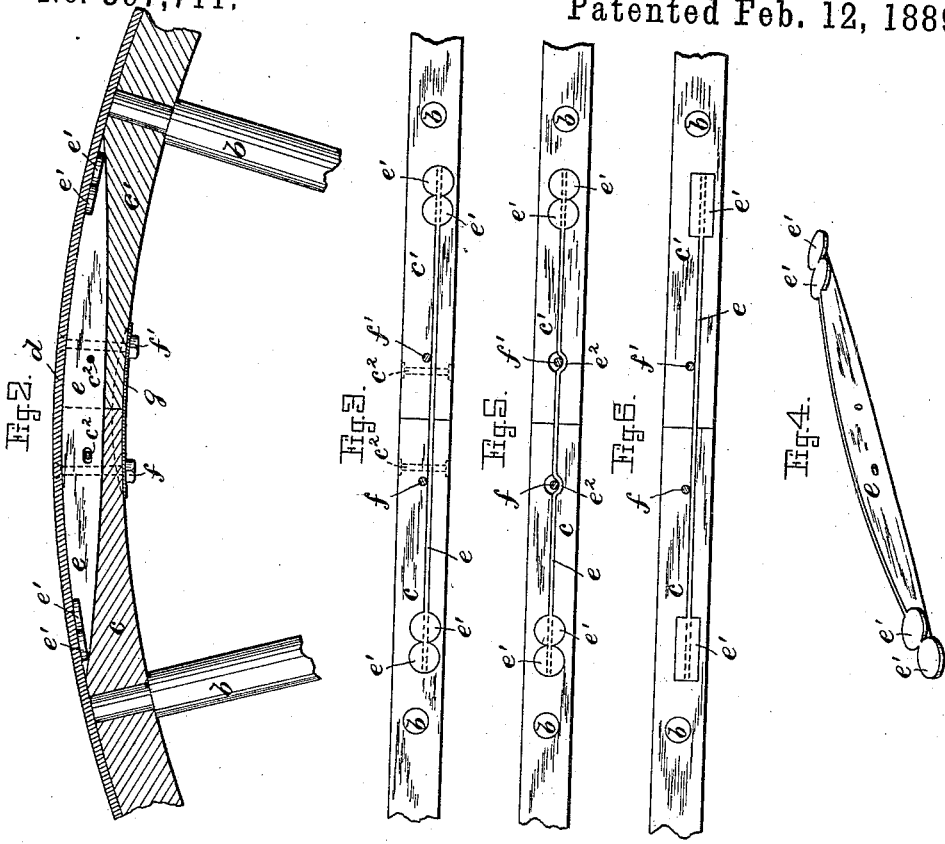
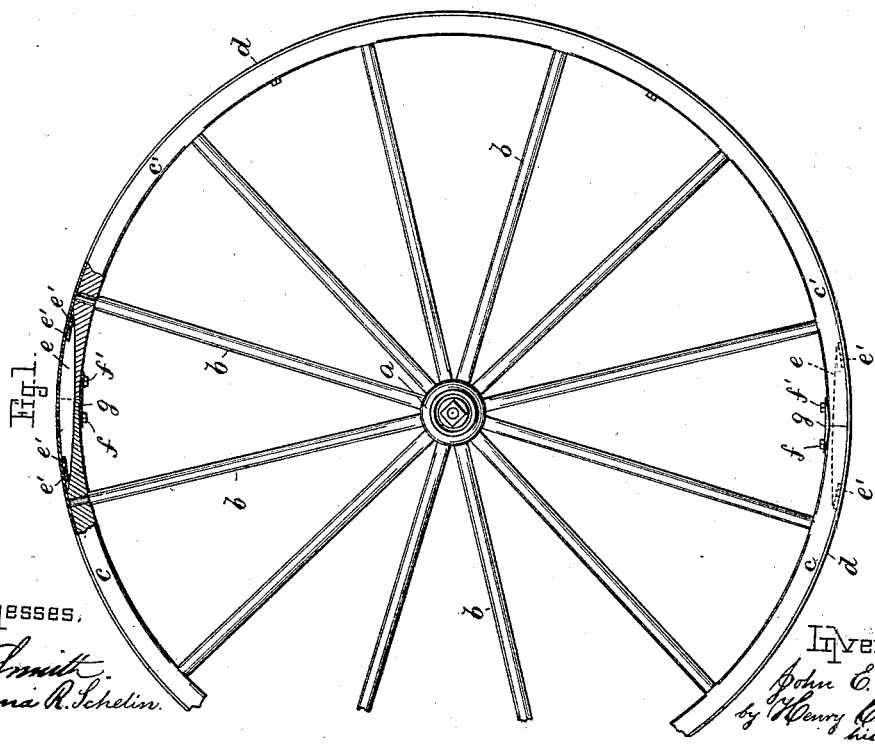
Witnesses,
E. J. Smith.
Selma R. Schelin.
Inventor
John E. Fisher
by Henry Chadbourn
his atty.

United States Patent Office.

JOHN E. FISHER, OF BOSTON, MASSACHUSETTS, ASSIGNOR OF ONE-THIRD TO WHITFIELD W. BAXTER, OF SAME PLACE.

VEHICLE-WHEEL.

SPECIFICATION forming part of Letters Patent No. 397,711, dated February 12, 1889.

Application filed November 8, 1888. Serial No. 290,264. (No model.)

*To all whom it may concern:*

Be it known that I, JOHN E. FISHER, a citizen of the United States, residing at Boston, in the county of Suffolk and State of Massachusetts, have invented certain new and useful Improvements in Vehicle-Wheels; and I do hereby declare the following to be a full, clear, and exact description of the invention, such as will enable others skilled in the art to which it appertains to make and use the same.

This invention relates to improvements in vehicle-wheels, and it is to prevent the flattening and breaking down of the felly and tire of the wheel at the place where the sections of the felly are joined together which comes midway between two of the spokes, and therefore causes the felly to be the weakest at that point.

The invention is carried out as follows, reference being had to the accompanying drawings, wherein—

Figure 1 represents a side elevation, partly in section, of a wheel provided with my improvement. Fig. 2 represents a detailed longitudinal section of a portion of a wheel provided with my improvement, and showing said improvement in side elevation. Fig. 3 represents a plan view of a portion of the rim of a wheel with the tire removed. Fig. 4 represents a perspective view of my improved truss or support for the wheel; and Figs. 5 and 6 represent plan views of a portion of the rim of a wheel with the tire removed, showing modifications of my truss or support.

Similar letters refer to similar parts wherever they occur on the different parts of the drawings.

Heretofore the sections of the felly of a wheel have been butted against each other and joined together by means of a dowel and the felly held against the inside of the tire by means of a clasp and tire-bolts; but such a construction is defective on account of the splitting of the felly by the dowel when a heavy load is being carried by the wheel. After the felly has become split, as above mentioned, the tire will commence to flatten, and a continued use of the wheel will break the felly off at the places where the spokes enter the felly.

This invention is to obviate this defect in the construction of a wheel, and it is carried out as follows:

$a$ on the drawings represents the hub, $b\ b\ b$ the spokes, $c\ c'$ two abutting sections of the felly, and $d$ the tire of a wheel in the usual manner, and form no part of my present invention. The sections $c\ c'$ of the felly are joined together midway between two of the spokes $b\ b$, and are provided at that place with a longitudinal groove or recess on the outside, which extends nearly the entire distance between the spokes. Within this recess I place the metal truss or support $e$, which is of such a form that the outer edge of the truss will just coincide with the outer circumference of the felly of the wheel when the truss is placed within the recess in the felly, and will rest against the inside of the tire. The bolts $f\ f'$ and the clasp $g$ hold the tire and the felly and truss firmly together, and they are made in the usual manner.

$e'\ e'$ represent bearing-plates, cast or otherwise made in one piece with the truss $e$, and one or more of such plates are made at or near the extreme ends of the truss. These plates are adapted to rest in suitable recesses on the outside of the felly to support the truss at its ends nearly, if not directly, over the spokes $b\ b$. Thus it will be seen that any pressure on the tire of the wheel tending to break down the felly at the joint will be resisted by the truss and its bearing-plates, which in turn will be supported by the spokes.

$c^2\ c^2$ represent rivets or bolts passing through the felly, one on each side of the joint, and also through perforations in the truss. The rivets $c^2\ c^2$ tend to keep the felly from splitting, and also to hold the truss within the recess before the tire has been set on the wheel. It is not essential that the rivets should be used, as the truss may be made to fit the recess close enough to keep it in place; but I prefer to use the rivets, especially on heavy wheels.

In Fig. 5 I have shown a modification of my invention, in which I provide the truss with two bends, $e^2\ e^2$, so as to bring the bearing-plates midway between the sides of the felly, as the bolts $f\ f'$, being in the center of the felly, would necessitate the placing of the truss a little on one side of the center if the truss were made straight, as shown in Fig. 3.

In Figs. 1, 2, 3, 4, and 5 I have shown the bearing-plates $e'$ $e'$ as being made of circular form; but this is not essential, as they might be made of rectangular form, as shown in Fig. 6, or of any other form, as may be desired; but I prefer to make them circular, as they can be more easily let into the felly by the use of a common bit.

This invention is very simple, cheap, and durable, and will cause a wheel to wear much longer than one made in the common way of making wheels.

I am aware that wheels have been made having a plain sheet of metal inserted within a recess in the felly of the wheel and secured by a number of rivets passing through said felly and sheet of metal; but I do not claim such a construction as my invention, as it will not accomplish the purpose I desire to accomplish.

Having thus fully described the construction, operation, and use of my invention, I wish to secure by Letters Patent—

1. In a vehicle-wheel, the truss $e$, adapted to be placed within a recess in the felly of the wheel, and having the bearing-plates $e'$ $e'$ made at or near the extreme end of said truss, for the purpose set forth and described.

2. In a vehicle-wheel, the combination of the truss $e$, bearing-plates $e'$ $e'$, made at or near the extreme ends of said truss, and one or more rivets or bolts, $c^2$ $c^2$, as and for the purpose set forth.

3. In a vehicle-wheel, the truss $e$, having bearing-plates $e'$ $e'$ made at or near the extreme ends of said truss, as described, placed within a recess in the felly of the wheel, in combination with the clasp $g$ and bolts $f$ $f'$, as and for the purpose set forth.

4. In a vehicle-wheel, the hub $a$, spokes $b$ $b$, felly $c$ $c'$, tire $d$, truss $e$, having bearing-plates $e'$ $e'$ made at or near the extreme ends of said truss, rivets $c^2$ $c^2$, clasp $g$, and bolts $f$ $f'$, all combined and arranged in a manner and for the purpose set forth.

In testimony whereof I have affixed my signature in presence of two witnesses.

JOHN E. FISHER.

Witnesses:
HENRY CHADBOURN,
MARTHA C. FISHER.